United States Patent [19]

Caferro et al.

[11] Patent Number: 5,628,477
[45] Date of Patent: May 13, 1997

[54] AUXILIARY AIRFOIL LOST MOTION DETECTOR AND ACTUATOR

[75] Inventors: Joseph S. Caferro, Seattle; Hector V. Tomassi, Renton, both of Wash.

[73] Assignee: The Boeing Company, Seattle, Wash.

[21] Appl. No.: 387,648

[22] Filed: Feb. 13, 1995

[51] Int. Cl.⁶ .............. B64C 13/14; B64C 3/50; B64C 13/30
[52] U.S. Cl. .......... 244/214; 244/75 R; 244/195; 244/215; 244/217; 244/224; 244/232
[58] Field of Search ............... 294/195, 90 R, 294/224, 232, 233, 210, 213, 214, 215, 216, 217, 75 R; 74/89.2, 89.22

[56] References Cited

U.S. PATENT DOCUMENTS

| | | | |
|---|---|---|---|
| 2,152,029 | 3/1939 | Cone | 244/215 |
| 3,593,092 | 7/1971 | Flippo | 318/364 |
| 3,935,754 | 2/1976 | Comollo | 74/664 |
| 4,173,322 | 11/1979 | Macdonald | 244/224 |
| 4,181,276 | 1/1980 | Kogure | 244/215 |
| 4,256,277 | 3/1981 | Embree | 244/213 |
| 4,521,060 | 6/1985 | Linton | 244/111 |
| 4,688,744 | 8/1987 | Aldrich | 244/213 |
| 4,799,822 | 1/1989 | Burandt et al. | 244/213 |
| 4,930,730 | 6/1990 | Quick | 244/224 |
| 5,344,103 | 9/1994 | Fitzgibbon et al. | 244/213 |
| 5,381,986 | 1/1995 | Smith et al. | 244/49 |
| 5,551,652 | 9/1996 | Verhoeven | 244/232 |

*Primary Examiner*—Andres Kashnikow
*Assistant Examiner*—Virna Lissi Mojica
*Attorney, Agent, or Firm*—Bernard A. Donahue

[57] ABSTRACT

Apparatus for detecting and signaling a skewing or misalignment of adjacent aircraft leading edge slats is disclosed. A cable is attached to an actuator having a compression spring system and located in an outboard slat. The cable passes through cable guides in several adjacent slats before being attached to an inboard slat. The compression spring system utilizes a dual concentric pair of compression springs for maintaining a tight cable. When a misaligned condition is detected by a proximity switch, the increased cable load will cause the actuator to lock itself in a position out of the range of the proximity sensor.

5 Claims, 6 Drawing Sheets

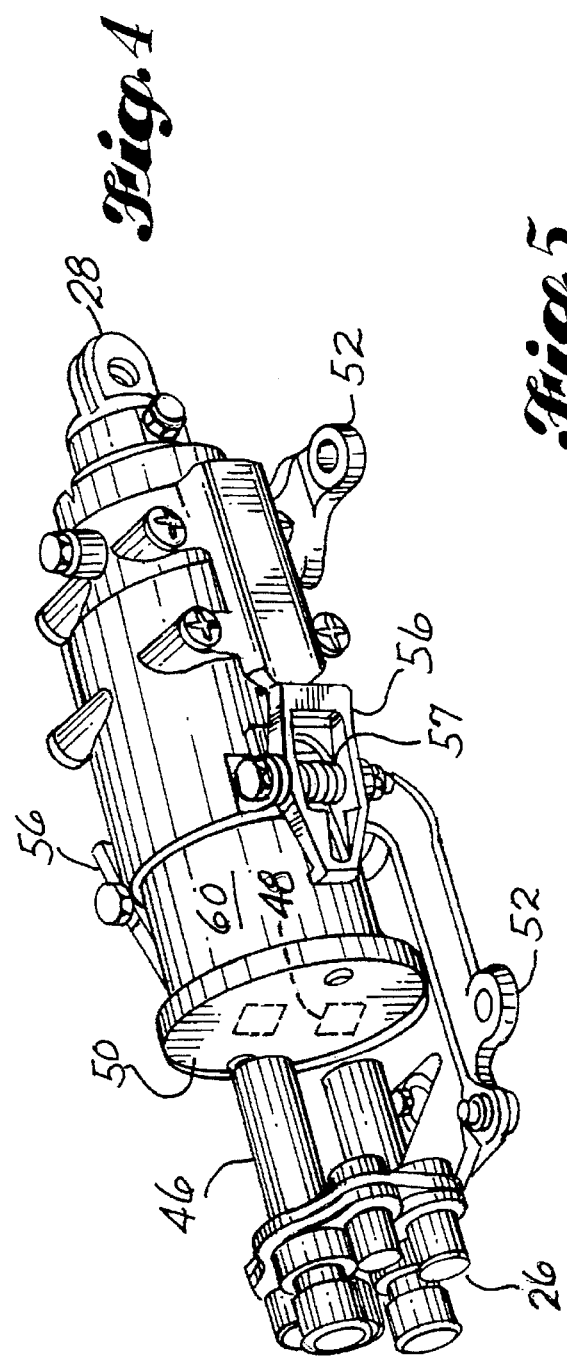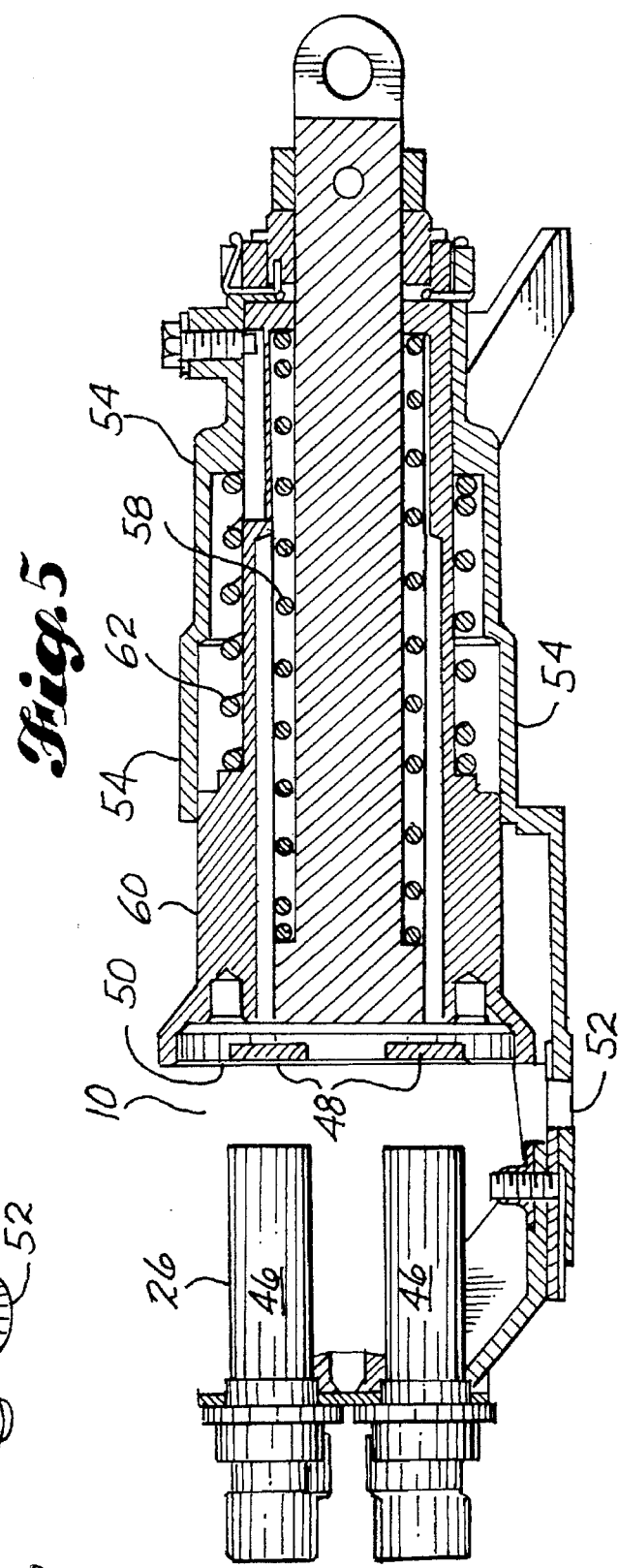

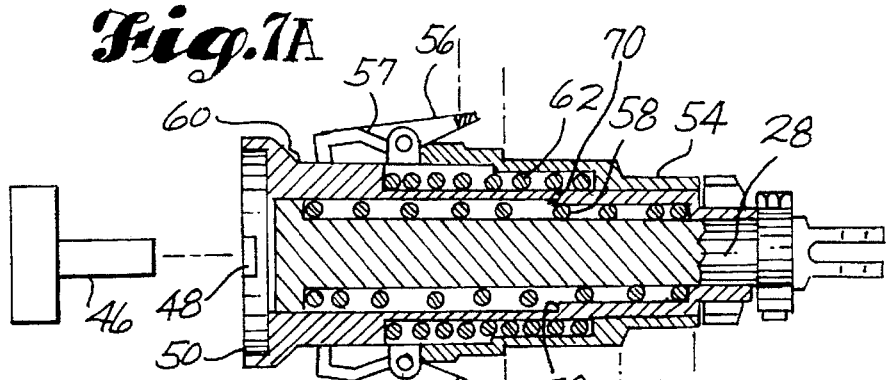
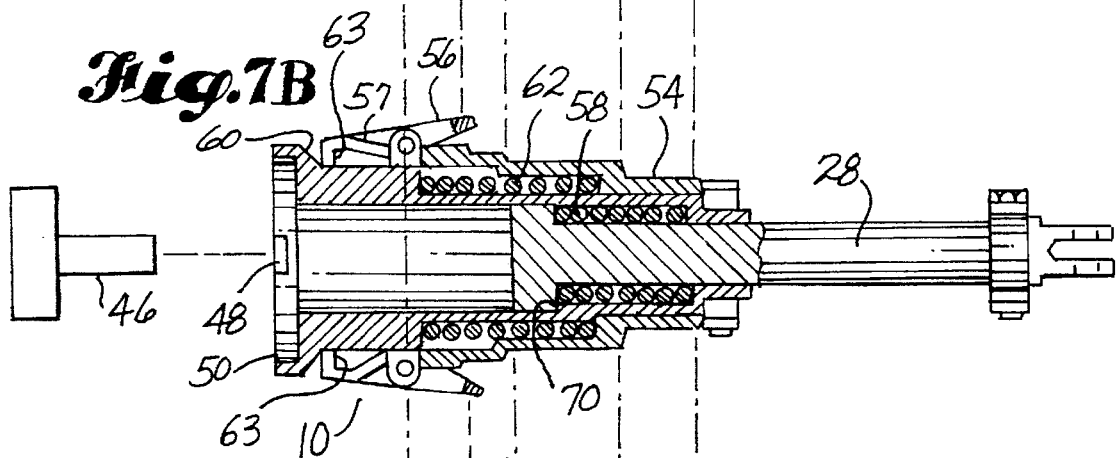
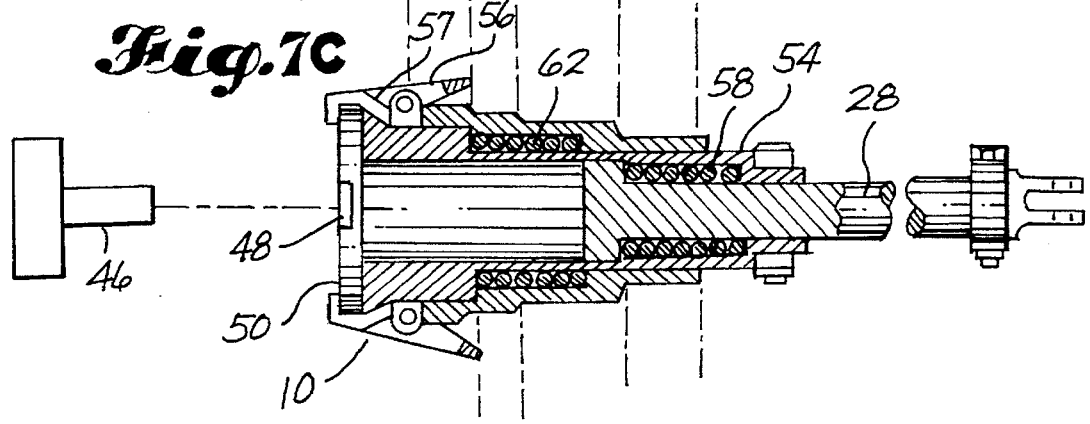

AUXILIARY AIRFOIL LOST MOTION DETECTOR AND ACTUATOR

FIELD OF THE INVENTION

This invention generally relates to a system and apparatus for detecting and signaling the presence of an undesired misalignment of one or more of several aligned elements, and more particularly, to a system for monitoring the alignment of a series of adjacent slats or flaps on an aircraft wing.

BACKGROUND OF THE INVENTION

Modern commercial passenger aircraft utilize auxiliary airfoils which are extended from the leading and trailing edges of the aircraft wing to increase lift during takeoff and landing of the aircraft. Such auxiliary airfoils are known in the industry as "flaps", that usually extend from the trailing edge of the wing, and "slats" which extend from the leading edge of the wing. When extended from the wing, these auxiliary airfoils increase the size and the effective curvature or camber of the wing and also increase the effective chord of the wing over which the airflow passes to create lift. Accordingly, aircraft lift is increased when slats and/or flaps are extended from the wing leading or trailing edges.

Such auxiliary airfoils are segmented, and each segment is individually positioned by separate but coordinated drive mechanisms in order to maintain the desired configuration for the wing during extension of the auxiliary airfoils. Accordingly, it is desired to monitor the position and alignment of individual slat segments with respect to the other slat segments at all times during use of the auxiliary airfoils. For example, if a significant misalignment or skewing of one or more of the slat segments occurs, this may indicate that an undesired or unsafe condition exists, in which case the drive mechanism should be automatically shut down to prevent further misalignment or skewing of the auxiliary airfoil system.

A problem in designing such a system is that there will always be normal relatively small spurious movements caused by the wing structural deflections, dynamics of the aircraft, or temperature changes that could confuse such a detection system, and cause it to respond to minor misalignments that do not present problems for the aircraft.

U.S. Pat. No. 3,935,754 relates to the detection and indication of the failure or loss of the primary drive train of a flap actuator system having both primary and secondary drive trains. An alarm signal is transmitted when the secondary drive train takes over. It is not intended to detect differences in the position of individual flap segments on a single side of the wing.

U.S. Pat. No. 4,181,276 relates to a system for monitoring synchronized motion of slats on the part and starboard wings. The system does not monitor differences of positions between flap segments on the same wing.

Another prior art detection and actuation system known to applicants uses a grounded extension spring attached to a monitoring cable and a hook attached to a micro switch. The hook is positioned to attach to the extension spring when it extends a predetermined amount in response to increased load in the monitoring cable. The hook will then actuate a microswitch which provides a signal indicating a misaligned condition.

Accordingly, it is an objective of this invention to provide improved apparatus to detect a serious displacement, or misalignment, of one or more adjacent auxiliary airfoil segments during their extension or retraction, while ignoring smaller spurious deflections that cannot be avoided and do not cause problems in the extension or retraction of the airfoil segments.

BRIEF DESCRIPTION OF THE DRAWINGS

FIG. 4 is an isometric view of a detector and actuator device according to this invention.

FIG. 5 is a plan cross-section view showing details of the double spring loaded actuator of this invention.

FIGS. 7A, 7B, and 7C show, respectively, in elevation view cross-section, a cable slack condition, a piston engaging sleeve condition, and a fully latched condition for the detector and actuator of this invention.

SUMMARY

The apparatus of this invention monitors and detects relative displacement or misalignment of segments of auxiliary airfoils such as slats or flaps. In a preferred embodiment, an electro-mechanical actuator is mounted inside of an outboard slat. A cable is attached to the actuator and is threaded in tension through guides in several adjacent inboard slats. The cable is attached or anchored to the most inboard of these slats. The actuator includes a first spring having a relatively low spring rate and a second spring having a higher spring rate. The actuator is rigged to maintain tension in the cable by maintaining compression in the first spring during normal structural and temperature deflections that do not indicate abnormal slat alignments. If abnormal slat skewing or misalignment occurs, the increased cable tension and load delivered to the actuator will compress both of the springs and move a sleeve carrying a spring biased pivoting clamp that will lock the actuator mechanism in a latched position. In that position, magnetic targets will be in a "far" location from proximity switches that will then send error signals to the Flaps/Slats Electronics Unit, resulting in an automatic shut-down of the slat drive system and an adjustment of other flight control parameters to compensate for the current slat position.

DESCRIPTION OF THE PREFERRED EMBODIMENTS

Figure 1:
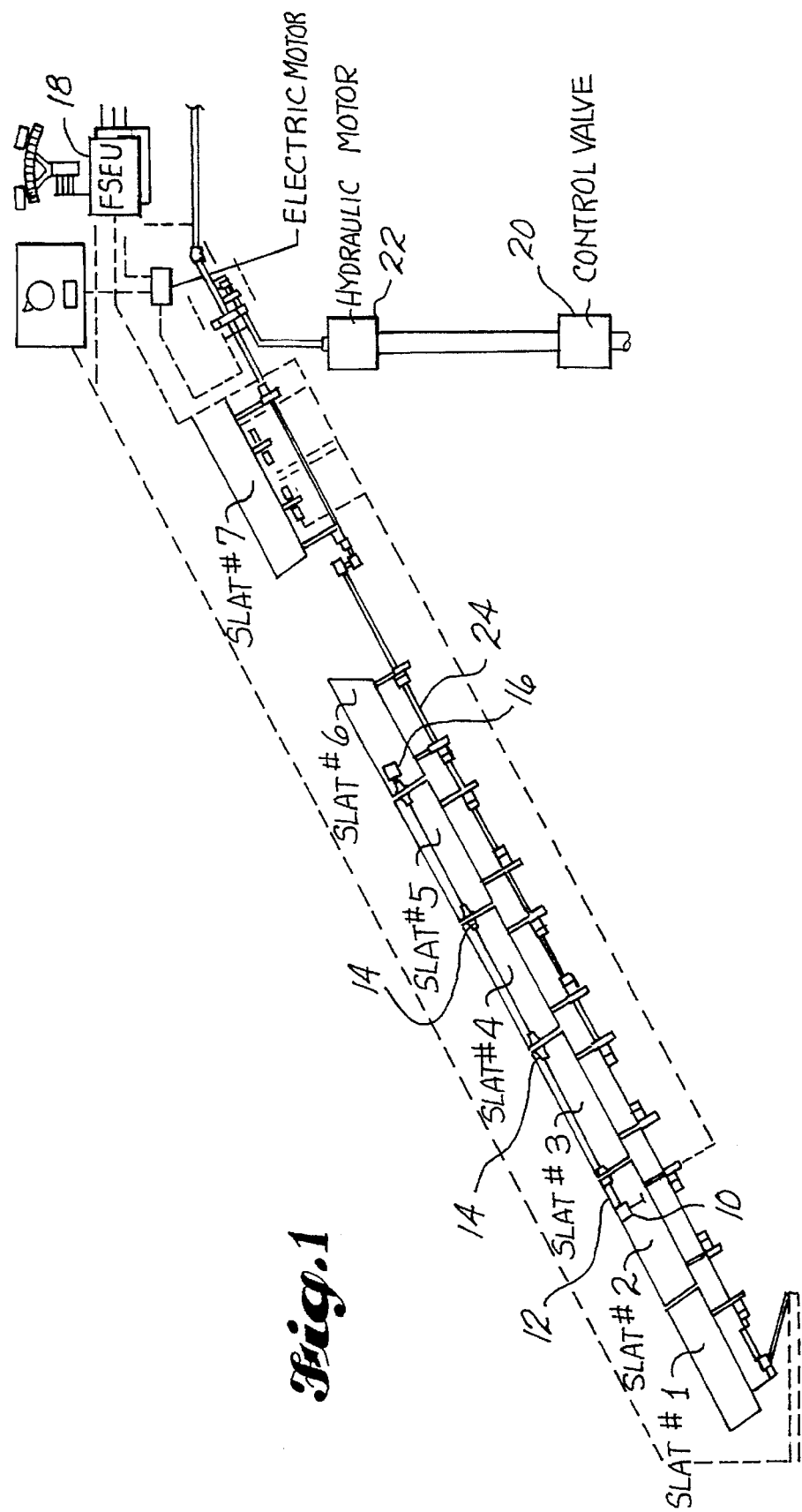
FIG. 1 is a schematic plan view of a slat system incorporating this invention on one wing of an aircraft.

FIG. 1 is a schematic diagram showing elements of a slat drive system on an aircraft wing and the slat misalignment detection system of this invention. A detector and actuator 10 of this invention is secured in slat #2. A wire rope or cable 12 attaches to actuator 10, extends under tension through a series of cable guides 14, and is secured or anchored at 16 in slat #6.

As will become more apparent in the discussion of the FIGURES that follow, if a serious skewing or misalignment of an individual slat occurs, dual redundant signals will be transmitted from the detector and actuator 10 to the Flap/Slat Electronics Unit 18 which will turn off the control valve 20 and shut down the hydraulic motor 22. When this happens, the movement of the slats will stop and they will no longer be driven by the torque tube 24. The Unit 18 will also automatically make adjustments in certain flight control systems. For example, the stick shaker will respond to a new stall speed computed by Unit 18 for the appropriate degree of slat extension.

Figure 2:
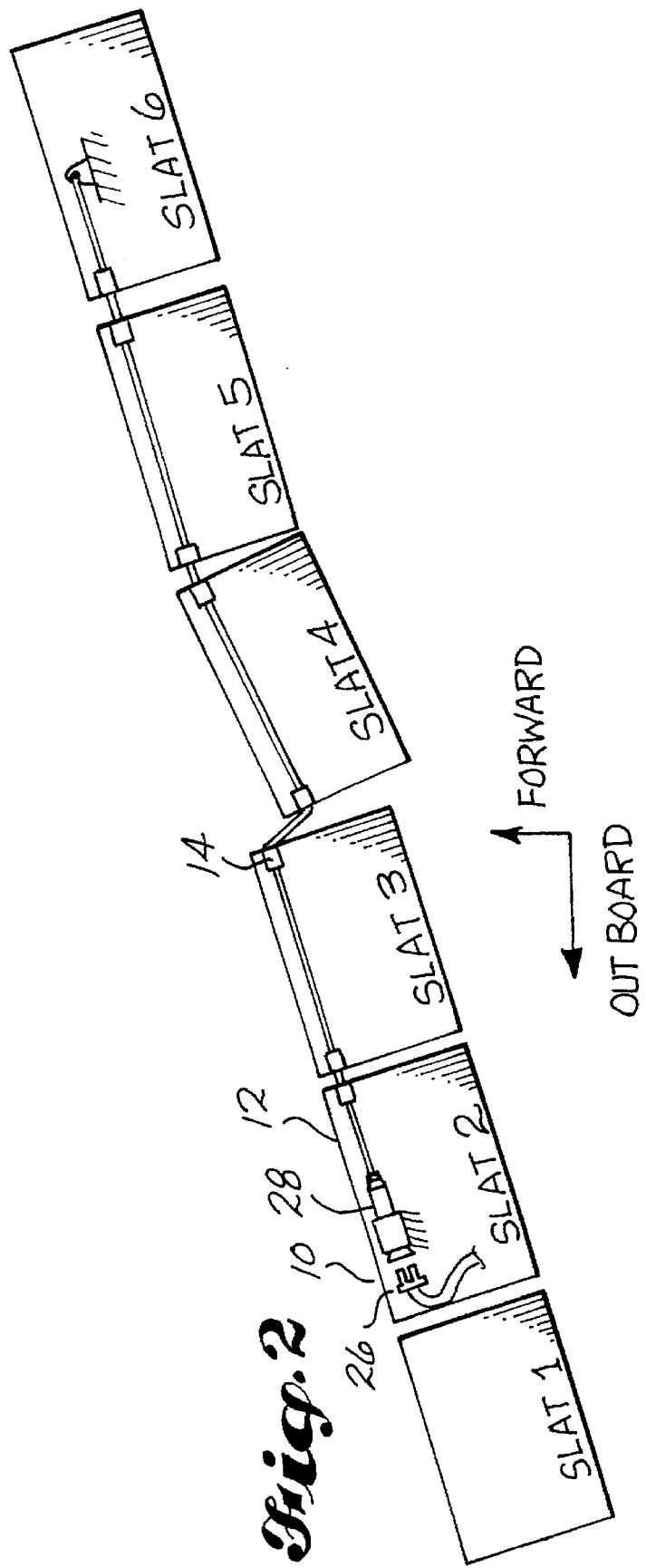
FIG. 2 is a schematic plan view of a group of slat segments showing a misalignment of slat segment 4.

FIG. 2 is a schematic plan view illustrating a slat skewing problem with slat #4. The detector and actuator 10 comprises a dual redundant proximity switch system 26, which is sensitive to the proximity of magnetic targets contained in the detector and actuator 10. When slat #4 becomes skewed beyond the limits established for normal structural and thermal misalignments, it will apply a much larger load to cable 12 and will extend a spring biased piston 28 of the detector and actuator 10.

Figure 3:
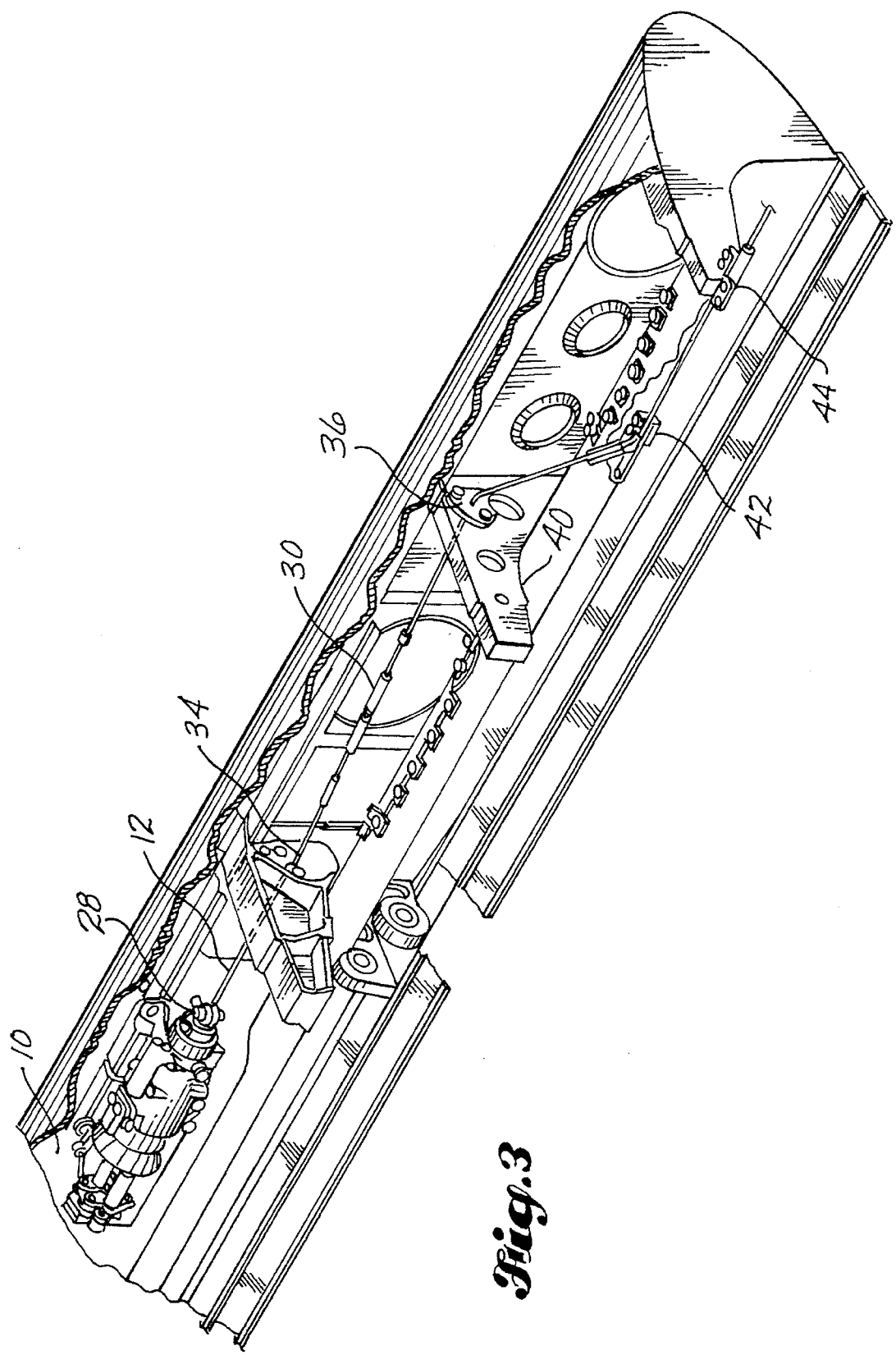
FIG. 3 is an isometric cutaway view showing an actuator and cable system of this invention, mounted inside slat segment 2.

FIG. 3 is an isometric cutaway view showing detector and actuator 10 mounted inside of slat #2. The wire rope or cable 12 has an adjustable turnbuckle 30. Cable 12 is attached to piston 28, and passes through cable guides 34 and 36 through the slat ribs 38 and 40. Cable 12 continues through cable guide 42 and exits from slat #2 at cable guide 44.

FIG. 4 is an isometric view of the detector and actuator device 10 of this invention. The dual redundant proximity switch system 26 includes a pair of inductive coil proximity sensors 46 aimed at a pair of magnetic targets 48 that are secured within a target assembly 50. Two attachment lugs 52 are provided on each side of the detector and actuator device 10 to secure it to structure within slat #2.

FIG. 5 is a cross-section plan view through the actuator device 10 showing the details and positions of its elements in an "at rest" position before it is rigged to perform its function as a lost motion detector and actuator for signaling a skewed or misaligned condition of one or more of the leading edge slats being monitored. FIGS. 4 and 5 show the pair of proximity sensors 46 to be aligned and aimed at the two target magnets 48. As mentioned, the housing 54 is rigidly attached to slat structure by means of four attachment lugs 52. Housing 54 can also be seen to be rigidly connected to the proximity switch system 26 and the spring biased pivoting latches 56. As shown in FIG. 4, latches 56 are urged by torsion springs 57 to rotate radially inward with respect to the target face.

Referring again to FIG. 5, the piston 28 is acted upon by a first spring means 58 that resists outward motion of the piston 28 by acting in compression between the piston 28 and a sleeve 60. A second spring means 62 acts to resist outward motion of both the piston 28 and the sleeve 60 by acting in compression between the moveable sleeve 60 and the stationary housing 54.

Figure 6:
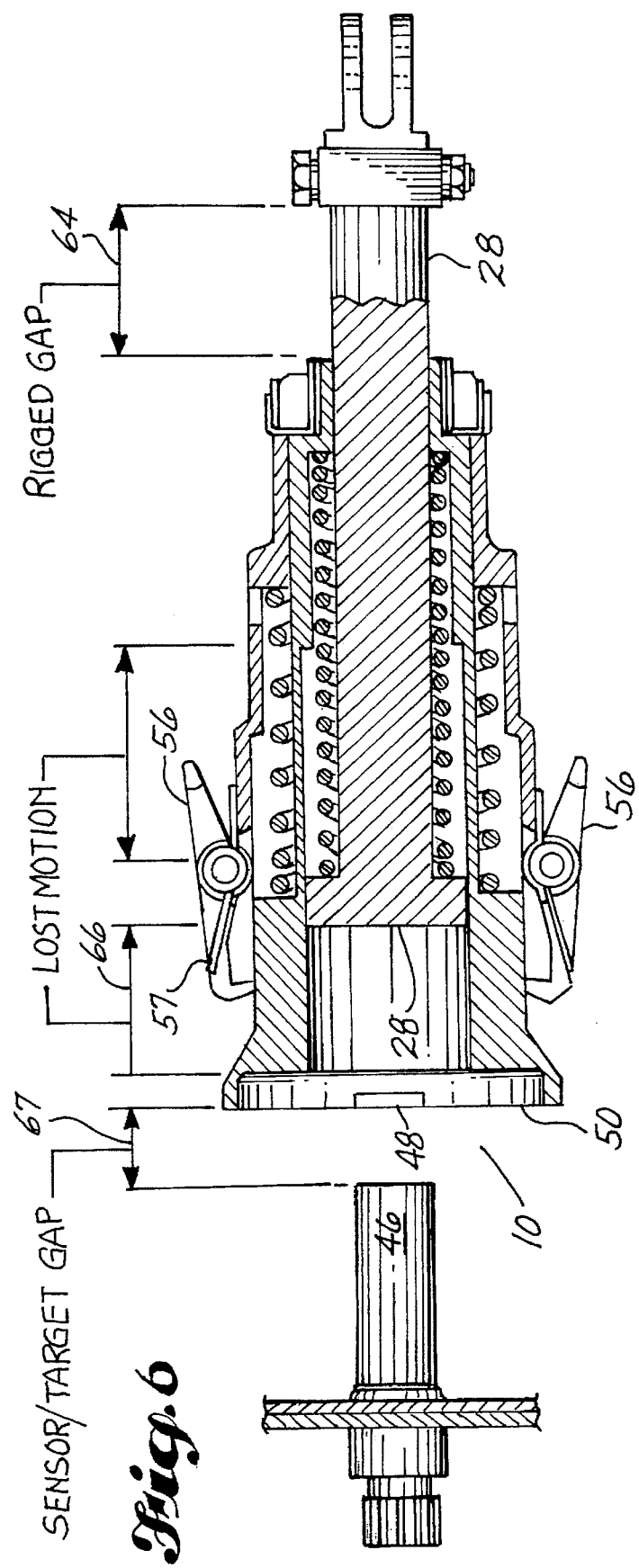
FIG. 6 provides an elevation cross-section view of the actuator in its "rigged" or monitoring mode.

FIG. 6 shows the detector and actuator 10 in a "rigged" configuration ready for use in detecting and signaling slat misalignment. In a preferred embodiment of this invention, the rigged gap, at 64, can be of the order of one to two inches (about 2.5 to 5 cm). This rigged gap will be obtained by adjustment of the cable turnbuckle 30 while the airplane is on the ground. This gap needs to be sufficient to prevent any impact between the piston 28 and the target assembly 50, under normal flight conditions where the cable becomes slightly slack. Accordingly, the gap distance at 66 should exceed the gap distance at 64 to prevent damage to the target assembly 50 if the cable becomes grossly slack, or disconnected.

The sensor target gap, at 67, needs to be established according to specifications pertaining to the magnets 48 and the sensor 46. The magnets will establish a magnetic field around the sensors 46. Changes in the distance or proximity between each sensor and its magnet will cause changes in the inductance values of a coil internal to the sensor. Accordingly, such a device may be used as a proximity switch. It will be calibrated to provide to the FSEU computer (18) a signal indicating if and when the gap becomes large enough to indicate that a slat skewing condition has occurred.

FIG. 7A, 7B and 7C show, respectively, in plan view and cross-section, a cable slack condition, a piston engaging sleeve condition, and a fully latched condition.

FIG. 7A shows a fully forward position for the piston 28, similar to FIG. 5 except the cross-section is taken 90° from that of FIG. 5. FIG. 7A shows the torsion spring biased pivoting latches 56 with their tip ends in pressing engagement with the sleeve 60.

FIG. 7B illustrates the position of the elements as they are just beyond the lost motion established by the first spring meters 58 and midway through the target actuation motion established by the second spring means 62. Together, the dual concentric compression springs provide a means for establishing a sequential double-action: "lost motion", followed by switch actuation. The first spring means 58 have a relatively low spring rate to allow lost motion for the most minor increases or decreases of load in the cable 12. The second spring means has a spring rate of about twice that of the first spring means (62), and is preloaded to resist compression until after the first spring means becomes almost fully compressed. This will occur when the first spring means is compressed by the piston 28 until the piston engages a stop at 70 on the sleeve 60.

FIG. 7C shows the detector and actuator 10 in a locked position. Assuming that a serious skewing condition has developed, the increasing load on the piston 28 from the cable (12) will first cause the first spring means 58 to nearly fully compress, next cause near full compression of second spring means 62, then the movable sleeve 60 will be pulled by further large loads on the piston 28 such that the sleeve will move with respect to the latch 56 until the nose 63 of the latch 56 begins to move up the ramp on sleeve 60. When the torsion spring latch 56 moves over and just past the lip 68 of the sleeve 60, it will snap down and lock the target assembly 50 and detector and actuator 10 in a position well removed from the detection range of the sensor 46. In this position the proximity sensors will send "target far" signals to the Unit 18. The powered drive of the slats will then be stopped and new flight control parameters computed and used to compensate for the skewed slat condition.

The invention is not to be limited to the details of the illustrated embodiment. Rather, coverage is to be determined by the claims which follow, construed in accordance with the rules of patent claim construction, including use of the doctrine of equivalents.

What is claimed is:

1. Apparatus for detecting and signaling a misalignment of adjacent auxiliary airfoil elements comprising:

a cable;

an actuator having a compression spring system attached to said cable;

a proximity sensor system attached to the housing of said spring system; and a latch means for locking said spring system with respect to said housing;

wherein said spring system responds to loadings in said cable, and said spring system controls movement of said cable toward and away from said housing until a predetermined cable loading is reached, at which time said actuator moves away from said sensor system and said latch means locks said spring system against movement.

2. The apparatus of claim 1 wherein said compression spring system comprises dual concentric springs.

3. The apparatus of claim 2 wherein said dual concentric compression spring system comprises: a first spring means having a relatively low spring rate and a second spring means having a substantially higher spring rate.

4. The apparatus of claim 1 wherein a pair of magnetic targets are carried by an internal sleeve on said spring system and said proximity sensor system includes dual redundant inductive coil sensors.

5. The apparatus of claim 1 wherein said actuator includes a sleeve that carries a target for said sensor system, and wherein said sleeve moves away from said sensor system and said latch means locks said sleeve in a position that is out of the range of said sensor system.

* * * * *